(12) United States Patent
Snyder (10) Patent No.: US 11,206,953 B1
(45) Date of Patent: Dec. 28, 2021

(54) SYSTEM AND METHOD FOR A VERSATILE FOOD PRODUCTION ARCHITECTURE

(71) Applicant: MADE IN SPACE, INC., Moffett Field, CA (US)

(72) Inventor: Michael Phillip Snyder, Mountain View, CA (US)

(73) Assignee: REDWIRE SPACE, INC., Jacksonville, FL (US)

(*) Notice: Subject to any disclaimer, the term of this patent is extended or adjusted under 35 U.S.C. 154(b) by 672 days.

(21) Appl. No.: 15/893,322

(22) Filed: Feb. 9, 2018

Related U.S. Application Data

(60) Provisional application No. 62/456,899, filed on Feb. 9, 2017.

(51) Int. Cl.
*A47J 44/00* (2006.01)
*G07F 11/62* (2006.01)
*A23L 5/10* (2016.01)

(52) U.S. Cl.
CPC ............ *A47J 44/00* (2013.01); *A23L 5/10* (2016.08); *G07F 11/62* (2013.01); *A23V 2002/00* (2013.01)

(58) Field of Classification Search
CPC ..... A21C 15/02; A21C 15/002; A21C 15/007; A21C 9/04; A47J 44/00; A23L 5/10; G07F 11/62; A23V 2002/02; A23G 9/286

USPC ......... 99/367, 325, 326, 357, 334, 352, 358, 99/355, 450.5, 450.4, 443 C, 443 R, 494, 99/451, 538; 426/274, 275, 574, 629, 426/641, 656, 634, 516–519, 531, 802
See application file for complete search history.

(56) References Cited

U.S. PATENT DOCUMENTS

| 4,944,218 A * | 7/1990 | Cresson ................... G07F 9/105 99/357 |
| 8,307,951 B2 | 11/2012 | Sus et al. |
| 2009/0223878 A1 | 9/2009 | Grundtvig et al. |
| 2009/0250316 A1 | 10/2009 | Gaetano et al. |
| 2013/0056555 A1 * | 3/2013 | Yuhki ...................... A61L 9/122 239/289 |

* cited by examiner

*Primary Examiner* — Phuong T Nguyen
(74) *Attorney, Agent, or Firm* — Terry M. Sanks, Esq.; Beusse Sanks, PLLC (57) ABSTRACT

A system to create a consumable good utilizing interchangeable ingredients is disclosed in which the system includes an ingredient storage location to hold a plurality of ingredients usable in the consumable good, a selector to gather ingredients selected for inclusion in the consumable good, a mixing device to prepare the ingredients, a processing device to convert the ingredients into the consumable good, and a completion location to at least one of store the consumable good and deliver the consumable good to a user. A method and another system are also disclosed.

10 Claims, 6 Drawing Sheets

SYSTEM AND METHOD FOR A VERSATILE FOOD PRODUCTION ARCHITECTURE

CROSS-REFERENCE TO RELATED APPLICATIONS

This application claims the benefit of U.S. Provisional Application No. 62/456,899 filed Feb. 9, 2017, the entire contents of which is incorporated herein by reference.

BACKGROUND

Embodiments relate to food processing and, more particularly, to a system and method for food production where ingredients are exchangeable.

Currently, many food products are distributed in some form of a finished condition. As an example, fast food restaurants receive ingredients for menu items already prepackaged. All ingredients may not be provided within a single package. As an example, the ingredients that may be specific to a sauce or flavoring may be prepackaged together whereas other components are packaged separately. The cook at the restaurant simply has to open the respective package and mix the ingredients together in preparing the menu item. Under this current approach, the ingredients may not be altered.

The same is realized with food products dispensed from a vending machine. They are prepackaged wherein the user can only select between different products, but not varied ingredient mixtures within a single product.

Therefore, if there is a desire to obtain a product that has a unique ingredient mixture that is not possible, unless the user prepares the food item at home. Also, the ability to replicate a preconfigured product is now possible without waiting for the final product to be shipped or maintained at a point of sale, for example. As a further limiting example, if the individual has certain dietary needs that may preclude eating certain food items or ingredients, under current situations, the user may not be able to enjoy all menu items as certain dietary prohibited ingredients may have been prepackaged and hence cannot be removed by the cook.

Similar situations arise with food that may be purchased from a vending machine. Seeing that all items are prepackaged, altering the ingredients in the food is not possible. Currently, logistically, prepackaged goods are shipped to a point of sale. The prepackaged goods generally require more physical space than ingredients alone, both during shipping and storing. Also, some prepackaged goods have a definite shelf life. As such, when a user retrieves a prepackaged product, the product may be stale due to a prolonged time storage.

Users and manufacturers would benefit from a system and method which would allow a recipient to select or omit ingredients that may be included in a food product that is provided prepackaged. Additionally, users and manufacturers would also benefit from a system and method that allows for having ingredients only at a point of sale, where some ingredients may be locally grown, where producing the final product and, if required, packaging occurs at the local location.

SUMMARY

Embodiments relate to a system and a method for preparing a food product where ingredients are variable based on a recipient's choice. The system comprises an ingredient storage location to hold a plurality of ingredients usable in the consumable good and a selector to gather ingredients selected for use in the consumable good. The system further comprises a mixing device to prepare the ingredients and a processing device to convert the ingredients into the consumable good. The system further comprises a completion location to at least one of store the consumable good and deliver the consumable good to a user.

The method comprises storing at least one ingredient in a storage bin located within an enclosure, gathering ingredients to be included in a consumable good, and mixing the ingredients within the enclosure. The method further comprises processing the ingredients to produce the consumable good within the enclosure, and at least one of storing the consumable good and delivering the consumable good to a user.

Another system comprises a chamber to at least one of grow and cultivate at least one ingredient, a user interface to at least one of select a predetermined recipe, alter a preset recipe, create a recipe and determine a portion of the consumable good, a creation device to obtain the at least one ingredient and process the at least ingredient with at least a second ingredient to create the consumable good specific to input provided at the user interface, and an enclosure to house the chamber and creation device.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
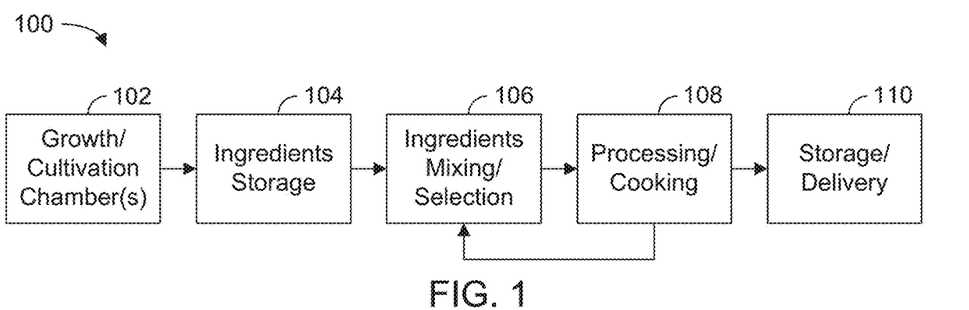
FIG. 1 shows an embodiment of a method integrated with a system.

FIG. 1 shows an embodiment of a method integrated with a system. The system 100, or creation device, may comprise at least one growth and/or cultivation chamber 102, an ingredients storage device 104, an ingredients mixing/selection device 106, a processor/cooking device 108, and a completion device 110 to at least one of storage and deliver a produced consumable good. In an embodiment, ingredients may be grown and/or cultivated in the chamber 102. Hence, raw forms of the ingredients such as, but not limited to, seeds may be provided where they are grown within the system 100. The ingredient storage device 104 may be a location, or bins. Though the term "device" and "chamber" are used, these terms are not meant to be limiting as these terms may be specific to a location or area where a particular activity occurs. Therefore, they may be used interchangeably along with location and area.

In an embodiment, the growth/cultivation chamber 102 may not be provided and instead just the ingredients are provided in the ingredients storage device 104.

The ingredients mixing/selection device 106 may be used to at least one of select particular ingredients and gather at least one ingredient. The ingredients mixing/selection device 106 may also be used to mixed the ingredients together prior to further processing. Processing of the ingredients may then occur with the processor/cooking device 108. Processing may include cooking, cooling, shredding, etc. The processing may cause at least one of a chemical change and a physical configuration or arrangement change. Depending on how the product has to be produced, additional processing may have to be done and, therefore, as shown, the product may be returned to the mixing/selection device 106. Depending on the subsequent ingredient(s) added, either additional processing/cooking may occur, or the product is stored or delivered.

Figure 2:
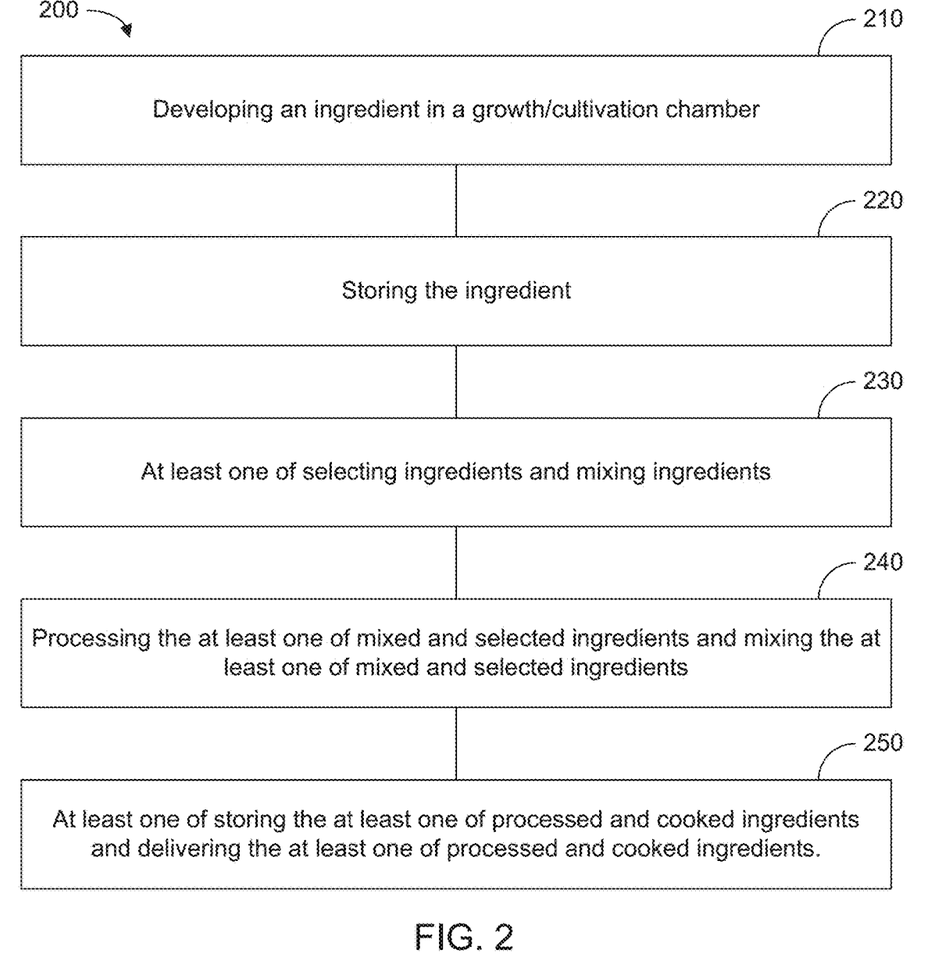
FIG. 2 shows a flowchart of an embodiment of the method.

Based on FIG. 1, FIG. 2 shows a flowchart of an embodiment of a method. The method 200 comprises developing an ingredient in a growth/cultivation chamber, at 210. As used herein developing may include growing, ripening, etc. Next, the method 200 comprises storing the ingredient, at 220. As discussed above, the step of developing the ingredient may be omitted and the ingredient is available in the storage area. The method 200 further comprises at least one of selecting ingredients and mixing ingredients, at 230. The method 200 further comprises at least one of processing the at least one of mixed and selected ingredients and mixing the at least one of mixed and selected ingredients, at 240. The method 200 further comprises at least one of storing the at least one of processed and cooked ingredients and delivering the at least one of processed and cooked ingredients.

Figure 3:
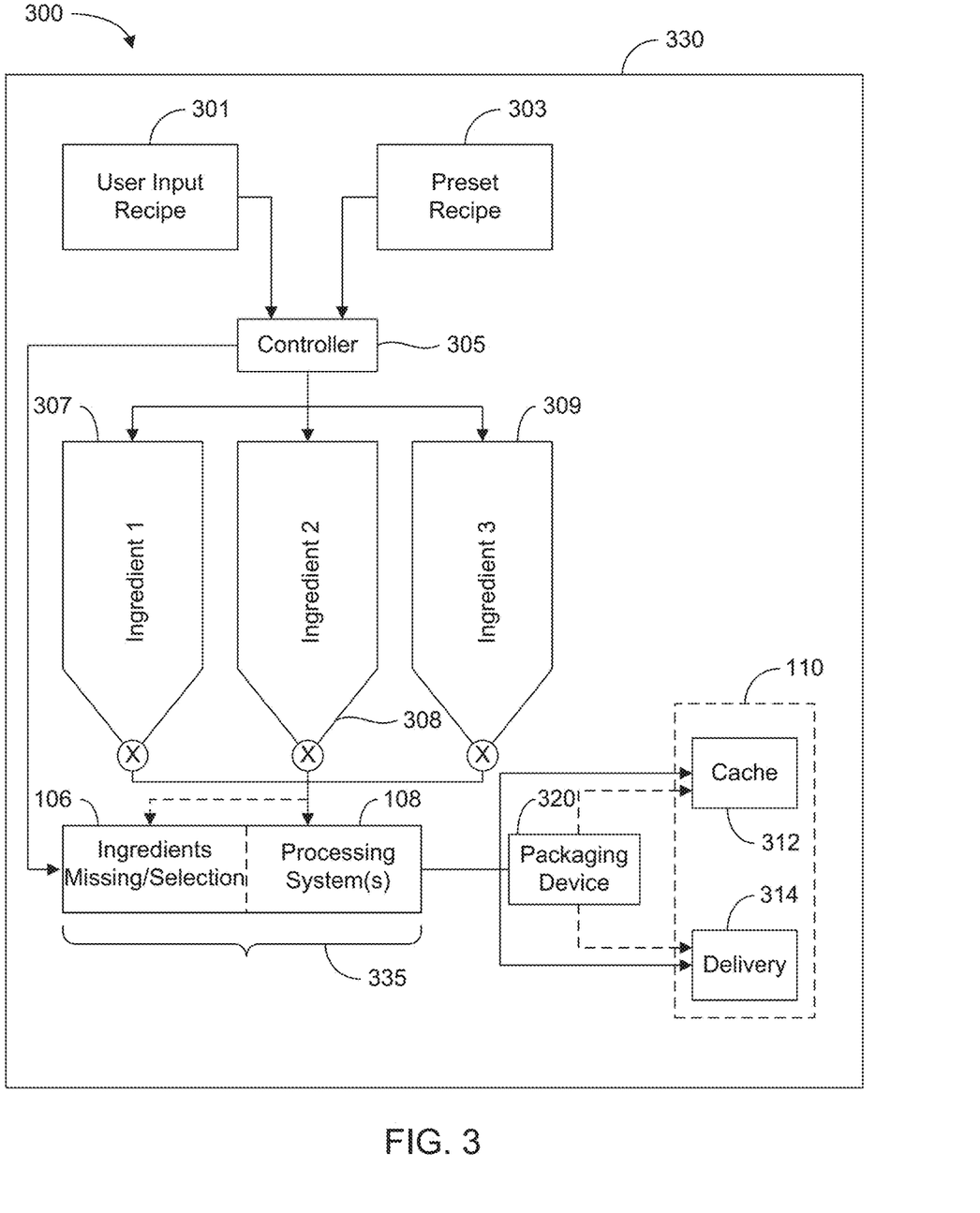
FIG. 3 shows an embodiment of a system.

FIG. 3 shows another embodiment of a system. The system 300 may have an input device 301 for a user to either input a recipe or alter a product based on a desired ingredient omission or addition. Additionally, the input device 301 may be used to select a pre-stored or preset recipe 303. The system 300 may create multiple end use consumable goods utilizing processing hardware and ingredients. In a non-limiting example, ingredient production and conditioning may be a function of the system 300. With respect to ingredient production, for plant based items, the plant based item may be grown within the system 300, as discussed briefly above. As mentioned above, the preset receipt 303 may also be provided. A controller 305 may be provided and used for operating the processing/cooking system 108 or the ingredients mixing/selection system 106, depending on the recipe selected. The controller 305 may be used to select particular ingredients, and an amount of each ingredient to be used. The ingredients are shown as being housed in bins, 307, 308, 309. Once processed, as disclosed above, the finalized good is either stored or delivered immediately to the user, as represented by the storage/delivery bin 110 in FIG. 1. As shown in FIG. 3 however, the storage/delivery bin 110 may comprise a cache location or bin 312 for the stored product and a delivery location or bin 314. A packaging device 320 may be provided to package the resulting consumable good. The consumable good in the packaging may be saved in the cache location 312. The consumable good may be optionally packaged when delivered directly to the user.

As shown above, instead of transporting or moving the ingredients to the ingredients mixing/selection system 106 or processing/cooking system 108, each of these systems is moved to the ingredients. Therefore, the conveyor discussed herein provides for the respective system to be moved to a location to receive additional ingredients. Thus, in an embodiment, both systems 106, 108 may be an integral unit where once mixed, the processing/cooking commences. If additional ingredients are needed, the integrated system 335 is arranged to receive the ingredients for further mixing or processing/cooking.

As will be explained further below, the system 300 may be part of or within an enclosure 330. Specifically, access to the user input device 301 may be on an outside of the enclosure 330 while other components of the creation device 100 may be completely or partially within the enclosure 330.

Figure 4:
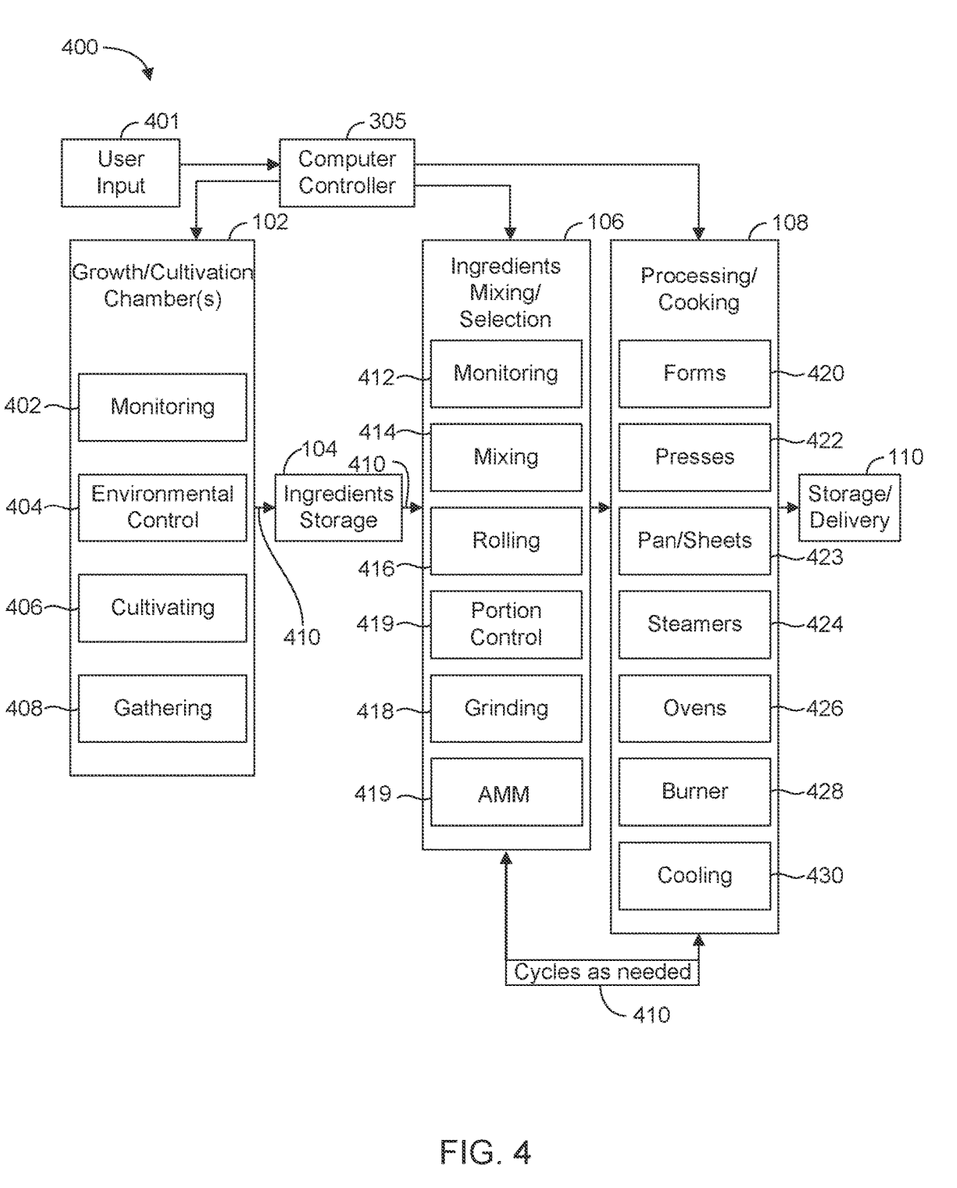
FIG. 4 shows a flowchart illustrating a process flow of the method shown in FIG. 1.

FIG. 4 shows a flowchart illustrating a more detailed process flow of the system shown in FIG. 1 and the method shown in FIG. 2. As shown, the method 400 may be initiated through a user input 401 and then the controller 304 that controls the operation. In another embodiment, the process may be manually controlled. As shown, within the growth/cultivation chamber 102, the system 400 monitors 402, cultivates 406 and gathers 408 the ingredients. An environmental control unit 404 may be provided to provide for proper environmental conditions within the chamber 102.

The resulting ingredient is then relocated at the storage location 104. Doing so may further ensure food safe conditions as fewer people will be involved with handling the ingredients.

Relocating the ingredient may be accomplished with a conveyor system 410. The ingredients may be moved, or conveyed, to the ingredient mixing selection device 106. The conveyor system 410 may be a carousel type movement system. Thus, the arrangement of the conveyor system is not limited.

At the ingredient mixing selection device 106, the process may include at least one of monitoring 412, mixing 414, rolling 416, and grinding 418 the ingredients to create the product. A portion controller 419 is also provided. In an embodiment, controlling an amount of the portion is also provided with the processor 304.

The mixed ingredients may be conveyed to the processing/cooking device 108. The processing cooking method may further comprise, but is not limited to, at least one of forming the product 420 such as, but not limited to, with a mold, pressing the product 422 such as, but not limited to, with a pressing device, steaming the product 424 such as, but not limited to, with a steamer, baking the product 426 such as, but not limited to, with an oven, boiling the product 428 such as, but not limited to, with a burner, etc. A sheet or pan may be provided to hold the consumable good during the processing process. A processing cooling device 430 may comprise an oven, a freezer, pans, sheets, and the like. If further ingredients are needed, the consumable good may be returned to the ingredient mixing selection device such as, but not limited to, by the conveyor system 410. As discussed above, the storage and delivery device 110 may then be provided for either storing (for later delivery) or immediate delivering the finished product, which has been conveyed from the processing/cooking device 108.

Figure 5:
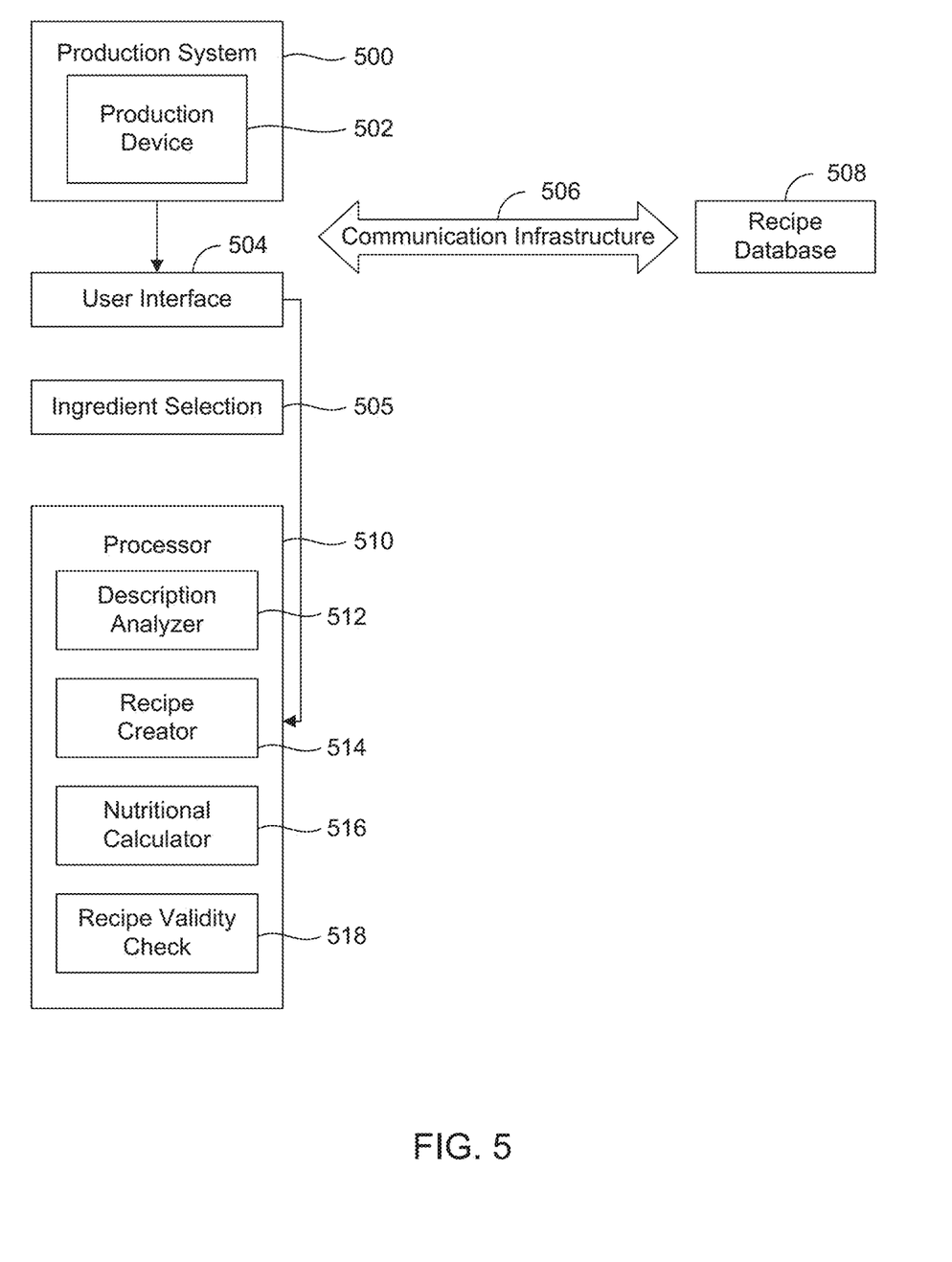
FIG. 5 shows another embodiment of the system from another perspective.

FIG. 5 shows another embodiment of the system from another perspective. As shown, a production system 500 is provided. The production system 500 comprises a production device 502 where the goods are made. An interface 504 is shown. The interface 504 may be used for ingredient selection 505. A communication infrastructure 506 is provided through which communication with a recipe database 508 is possible. The recipe database 508 may be amended over time with new recipes. A processor 510 is provided. More information about the processor is provided herein. The processor 510, or controller, may perform at least one of a plurality of processes such as, but not limited to, analyze the product to be created such as with a description analyzer 512, provide for creating new recipes (by the user) such as with a recipe creator 514, determine a nutritional value of the produce being made such as with a nutritional calculator 516, and validate that the recipe is valid such as with a recipe validity checker 518.

Figure 6:
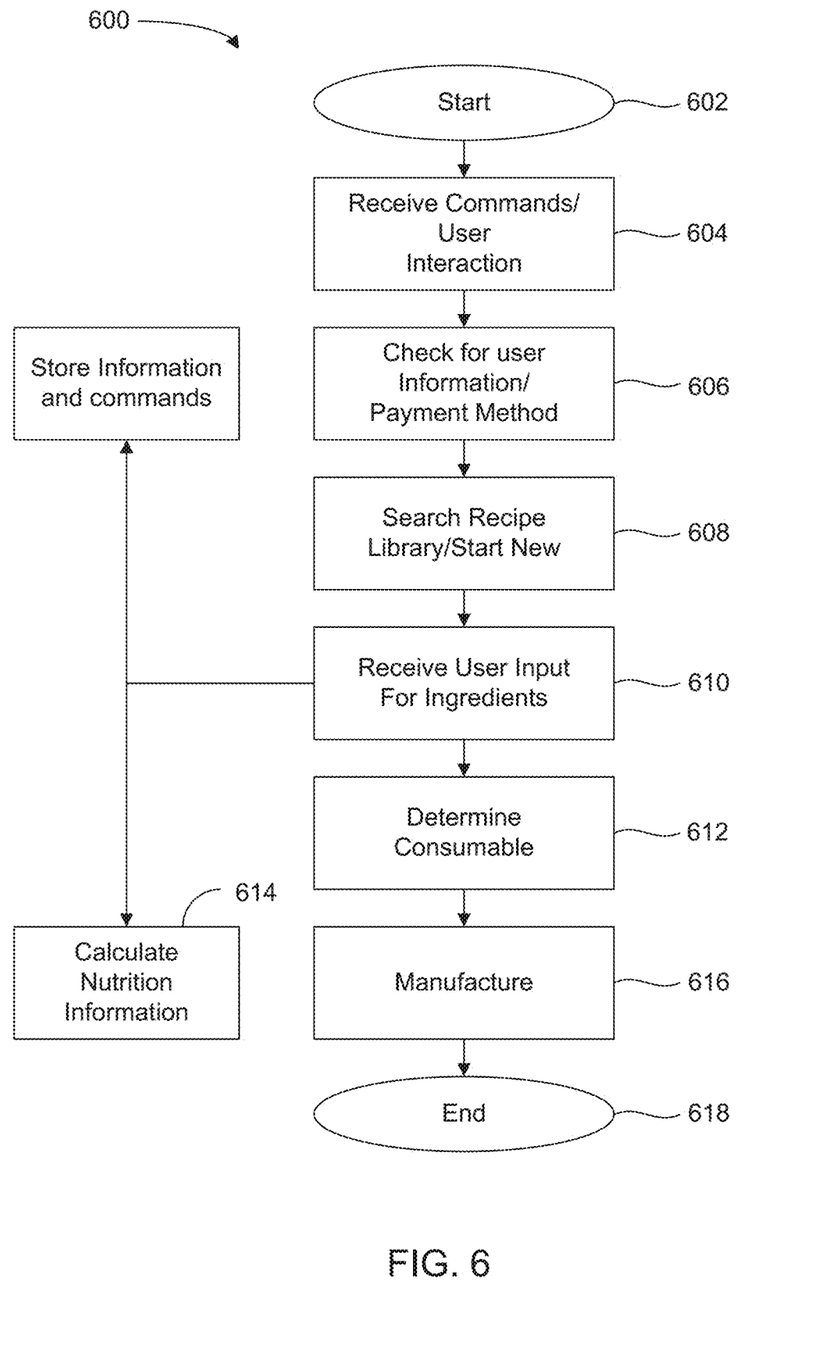
FIG. 6 shows another embodiment of a method.

FIG. 6 shows a flowchart illustrating another method. As shown, once the method 600 starts at 602, receiving commands/user interaction occurs at 604. The method 600 provides for checking for at least one of user information and payment method at 606. More specifically, in an embodiment, if the system is in a vending machine arrangement, checking for user payment method occur. In a vending machine arrangement, an enclosure 330, as shown in FIG. 3, may be provided to hold the components of the system. If not a vending machine and the user has authorization to use the system, checking for user information to verify access is allowed may occur.

Next, either searching for a recipe or creating a new recipe occurs at 608. Receiving the user input regarding ingredients occurs at 610. The information is then used to determine the amount of ingredients in the consumable at 612. Calculating nutrition information may also occur at 614 where the information is provided to the user. Manufacturing then occurs at 616. The method then ends at 618.

In an embodiment, as discussed above, the system may be considered a customizable vending machine. In operation, the user may select the ingredients and form for a particularly desired good. The system, or machine, would create the desired product based on the user defined inputs. The machine could also comprise presets to create particular items without having to select the ingredients. The machine may also be updated with new recipes.

As shown, the system may comprise ingredient holding, or storage, bins. The system may also comprise a processing area. At the processing area, the product may be mixed or formulated. A final preparation area is also provided. At the final preparation area, if needed, the product may be cooked, heated, cooled, bagged, etc. In a non-limiting example, the processing area comprises applying an additive manufacturing process, generally within an additive manufacturing machine (AMM) 419, which may be employed to supply the ingredients with a desired consistency for each ingredient. The final preparation area may also be within an additive manufacturing machine as the temperature change may occur with the additive manufacturing machine. The additive manufacturing process and machine may be a three-dimensional ("3D") additive manufacturing process or machine such as, but not limited to, a printer. Thus, the systems disclosed herein are parts of an additive manufacturing device or machine.

The system may also comprise an area where certain ingredients are grown. Also included is a subsystem to at least one of select, acquire, and transport the ingredients as needed. This subsystem may be a robotic subsystem. Also, a conveyor subsystem may be included.

Programmed recipes may be provided wherein users may either customize or create entirely new recipes allowing the included ingredients to be utilized and placed both in different types of consumables. Using the components above, the finalized consumable may be cooked or raw. Furthermore, it may have a plurality of forms such as, but not limited to, bar-shaped and loaf-shaped.

In another embodiment, instead of providing raw ingredients, seeds, initial plant nutrients, another medium used to produce the raw material may be provided. The system would then convert this level of ingredients into a type that may be used for the consumable.

Also disclosed is storing information and commands once user information and/or payment information is checked. Also provided is calculating nutritional information.

Figure 7:
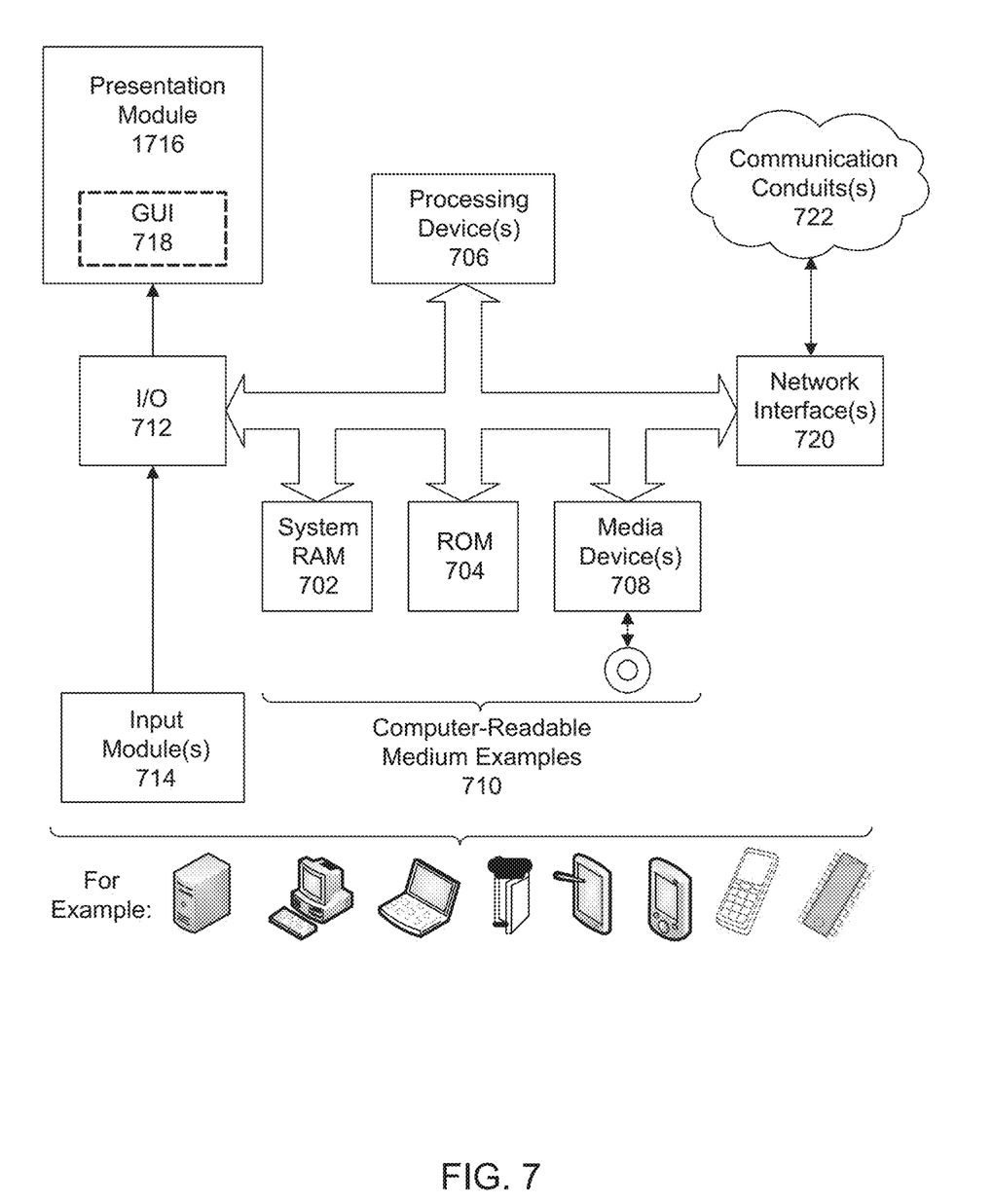
FIG. 7 sets forth an illustrative computing functionality that may be used with embodiments described herein.

FIG. 7 sets forth an illustrative computing functionality that may be used with embodiments described herein. The method described herein may be used in association with the computing functionality 700 disclosed below. In all cases, computing functionality 700 represents one or more physical and tangible processing mechanisms. The computing functionality 700 may comprise volatile and non-volatile memory, such as random access memory (RAM) 702 and read only memory ("ROM") 704, as well as one or more processing devices 706 (e.g., one or more central processing units (CPUs), one or more graphical processing units (Gus), and the like). The computing functionality 700 also optionally comprises various media devices 708, such as a hard disk module, an optical disk module, and so forth. The computing functionality 700 may perform various operations identified above when the processing device(s) 706 execute(s) instructions that are maintained by memory (e.g., RAM 702, ROM 704, and the like). The computing functionality may be performed under a plurality of different arrangements ranging from, but not limited to, collectively at a single location to over a wired or wireless network with remote servers hosted on the Internet to store, manage, and process data, rather than a local server or computer.

Instructions and other information may be stored on any computer readable medium 710, including, but not limited to, static memory storage devices, magnetic storage devices, and optical storage devices. The term "computer readable medium" also encompasses plural storage devices. In all cases, computer readable medium 710 represents some form of physical and tangible entity. By way of example, and not limitation, the computer readable medium 710 may comprise "computer storage media" and "communications media."

"Computer storage media" comprises volatile and non-volatile, removable and non-removable media implemented in any method or technology for storage of information, such as computer readable instructions, data structures, program modules, or other data. The computer storage media may be, for example, and not limitation, RAM 702, ROM 704, EPSOM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, FRO, infrared, and other wireless media. Combinations of any of the above are also included within the scope of computer readable medium.

The computing functionality 700 may also comprise an input/output module 712 for receiving various inputs (via input modules 714), and for providing various outputs (via one or more output modules). One particular output module mechanism may be a presentation module 716 and an associated graphic user interface ("GUI") 718. The computing functionality 700 may also include one or more network interfaces 720 for exchanging data with other devices via one or more communication conduits 722. In some embodiments, one or more communication buses 724 communicatively couple the above-described components together.

The communication conduit(s) 722 may be implemented in any manner (e.g., by a local area network, a wide area network (e.g., the Internet), and the like, or any combination thereof). The communication conduit(s) 722 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (Fogs), Application-specific Integrated Circuits (Asics), Application-specific Standard Products (Asps), System-on-a-chip systems (Sacs), Complex Programmable Logic Devices (Colds), and the like.

Thus, as disclosed above, utilizing the system and method disclosed reduces the logistical strain common to many food production companies. Instead of distributing finished goods, the raw ingredients can be sent and used to manufacture edible goods on demand locally. Further, a particular set of ingredients can make a wide variety of end use goods. For example, common constituents of a baked good can be used to make many types of that good. The batter for bread or cookies is relatively close with only minor adjustments with minor ingredients that determine the type of bread or cookie.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things device, and the like).

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A system to create a food product utilizing interchangeable ingredients, the system comprises:
    a growth and cultivation chamber to cultivate an ingredient;
    an ingredient storage location to hold a plurality of ingredients usable in the food product, wherein the cultivated ingredient is provided to the ingredient storage location;
    a selection device to gather ingredients selected for use in the food product and selection of the ingredients is based on at least a preset consistency supplied by an additive manufacturing machine and a recipient's ingredient preference;
    a mixing device to prepare the ingredients, the ingredients include the cultivated ingredient;
    a processing device to convert the ingredients into the food product; and
    a completion location to at least one of store the food product and deliver the food product to a user.

2. The system according to claim 1, further comprising a conveyor system to transport at least one of the ingredients between the storage location, the selection device, the mixing device, the processing device and the completion location and the mixing device, processing to the ingredients.

3. The system according to claim 1, wherein the growth and cultivation chamber further to grow an ingredient wherein the grown ingredient is provided to the ingredient storage location.

4. The system according to claim 1, further comprising a controller to control movement of an ingredient through the system and movement of the food product.

5. The system according to claim 4, further comprising a user interface in communication with the controller to at least one of select a recipe to use to produce the food product and to alter a preset recipe prior to production of the food product.

6. The system according to claim 1, wherein the completion location comprises at least one of a cache to store the food product and a delivery area to provide the food product to the user.

7. The system according to claim 1, further comprising an enclosure to hold the ingredient storage location, the selection device, the mixing device to prepare the ingredients, the processing device, and completion location.

8. The system according to claim 1, wherein at least one of the selection device and the mixing device comprises at least one of a monitoring device, a mixing device, a rolling device, a portion control device, and a grinding device.

9. The system according to claim 1, wherein the processing device comprises at least one of a device to form the food product, a pressing device to form the food product, a pan to hold the food product during processing, a steamer to prepare the food product, and an oven to cook the food product.

10. The system according to claim 1, further comprising a packaging device to package the food product prior to locating the food product for at least one of storage and delivery to the user.

* * * * *